UNITED STATES PATENT OFFICE.

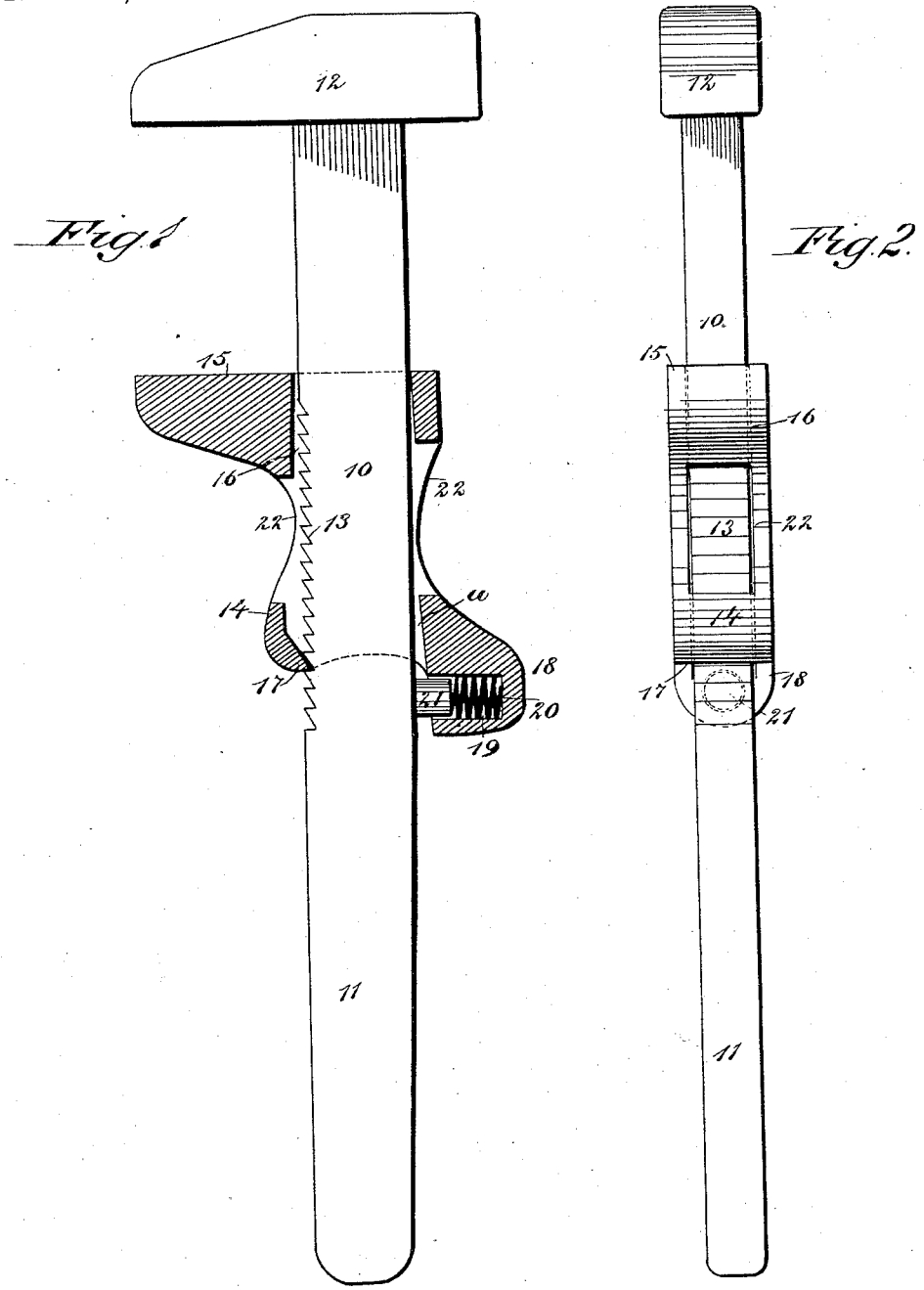

WILLIAM HENRY HAIRE, OF MORRISTOWN, TENNESSEE.

WRENCH.

SPECIFICATION forming part of Letters Patent No. 469,562, dated February 23, 1892.

Application filed May 15, 1891. Serial No. 392,849. (No model.)

*To all whom it may concern:*

Be it known that I, WILLIAM HENRY HAIRE, of Morristown, in the county of Hamblen and State of Tennessee, have invented a new and useful Improvement in Wrenches, of which the following is a full, clear, and exact description.

My invention relates to an improvement in wrenches, and has for its object to provide a tool of simple, durable, and economic construction, comprising, essentially, two pieces; and a further object of the invention is to provide for a rapid and convenient adjustment of the jaws to and from each other.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in both the views.

Figure 1 is a side elevation of the wrench, partially in section; and Fig. 2 is a front elevation of the same.

In carrying out the invention the shank 10 is preferably made rectangular in cross-section, and the lower end of the shank constitutes a handle 11. The upper jaw 12 of the tool is integral with or attached rigidly to the upper extremity of the shank, and in one side face of the latter, at or near the center, a series of teeth 13 is produced. A sleeve 14 is held to slide upon the shank, the upper end of which is provided with a horizontal lip at one side, constituting the inner or movable jaw 15 of the wrench. The bore 16 of the sleeve is mainly rectangular in cross-section, and extends from top to bottom; but said bore is widest at its lower end. The lower extremity of the wall of the bore at the side of the sleeve carrying the jaw 15 is inclined, as shown in Fig. 1, whereby a tooth 17 is produced, adapted to engage with the toothed surface of the shank, and the opposite wall of the bore is also inclined, but from top to bottom, as shown at *a*, whereby when the tooth of the sleeve is in engagement with the teeth of the shank the sleeve-surface *a* will be out of engagement with the shank. Such position is the normal position of the sleeve, and it is so maintained by forming upon the back of the sleeve at its lower end an extension 18, provided with a horizontal recess 19, containing a spring 20, connected with a bolt or block 21, the latter being at all times in engagement with the shank. When the sleeve is not being adjusted, the bolt or block engages with the shank under the pressure of the spring 20, and the pressure of the spring is sufficient to force the rear portion of the sleeve out of engagement with the shank. When the sleeve is in this position, the wrench is in condition for use.

The adjustment of the jaws is quickly and conveniently made by pressing the extension of the sleeve to an engagement with the shank, at which time the bolt or block 21 will enter the recess in the extension. When the sleeve is so pressed, the tooth of the sleeve is disengaged from the teeth of the shank, and the former may be moved upward or downward upon the latter readily and expeditiously, as occasion may demand. The moment the sleeve is released by the manipulator the spring 20 acts upon the bolt and forces the extension end of the sleeve outward, thus carrying the tooth thereof into a locked position with the shank. In order to render the sleeve as light as possible consistent with strength, an opening 22 is preferably made in its front and in its rear sides.

As the wrench consists, mainly, of two pieces it is exceedingly simple and economic in construction, and the operator may, with the same hand with which the wrench is grasped, readily run the sleeve upward or downward upon the shank to adjust the lower or inner jaw to an engagement with nuts, bolt-heads, or their equivalents of varying sizes.

Having thus described my invention, I claim as new and desire to secure by Letters Patent—

As a new article of manufacture, a wrench comprising the shank 10, toothed on its forward edge and having a fixed jaw 12, the elongated sleeve 14, sliding on the shank, cut away between its ends on its front and rear sides, as at 22, and formed at the lower end of its bore with the single inwardly-projecting tooth 17 and in its opposite wall below the tooth with an extension 18, having a socket 19, the rear wall of the bore of the sleeve being inclined, as shown at *a*, the spring 20 in the socket, and the follower 21 in front of the spring and bearing on the shank, substantially as shown and described.

WILLIAM HENRY HAIRE.

Witnesses:
 D. PENCE,
 C. K. MURPHEY.